Jan. 4, 1927.

G. W. O. MARTIN

PRESSURE TEMPERING

Filed Sept. 18, 1925      3 Sheets-Sheet 1

1,613,521

Inventor:
Giles W. O. Martin
By James R. Hodder
Atty.

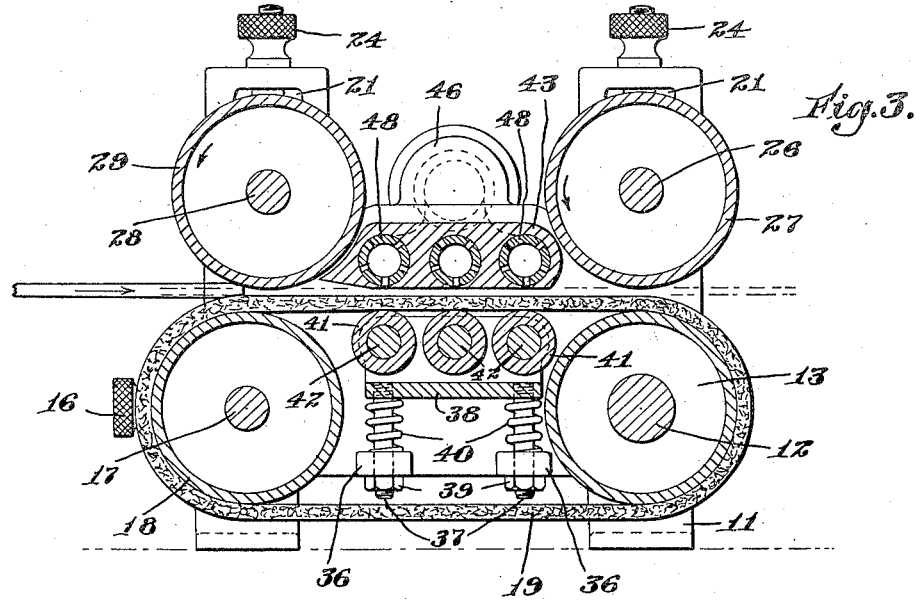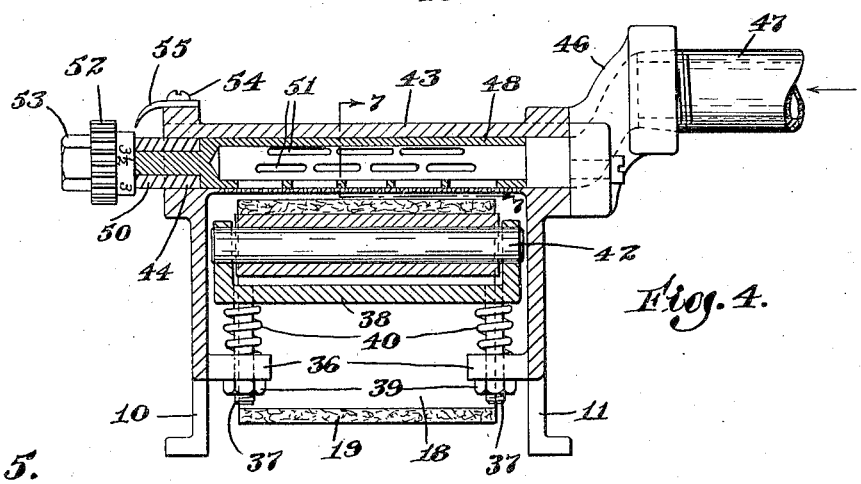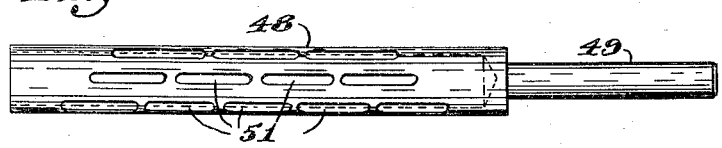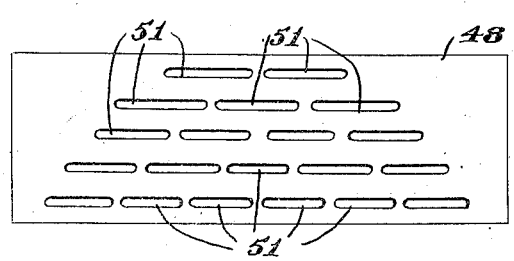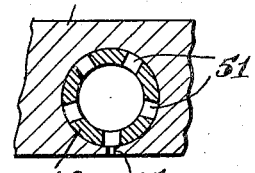

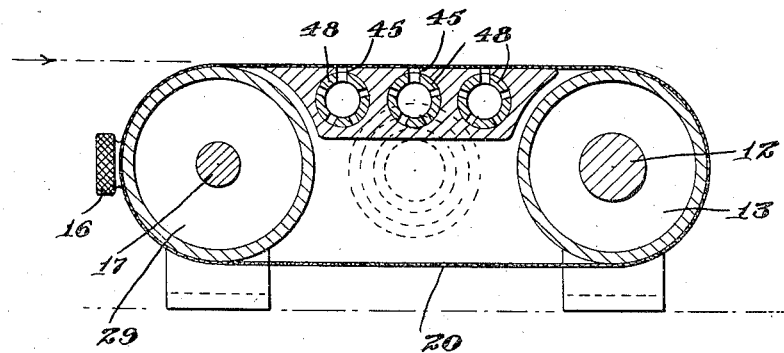
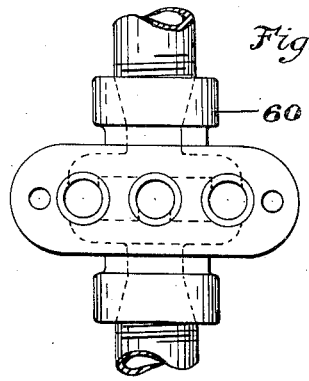
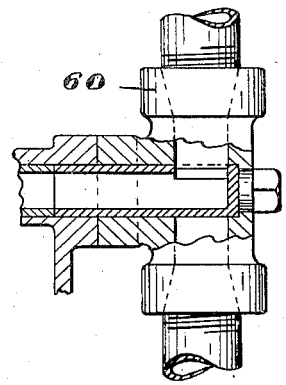
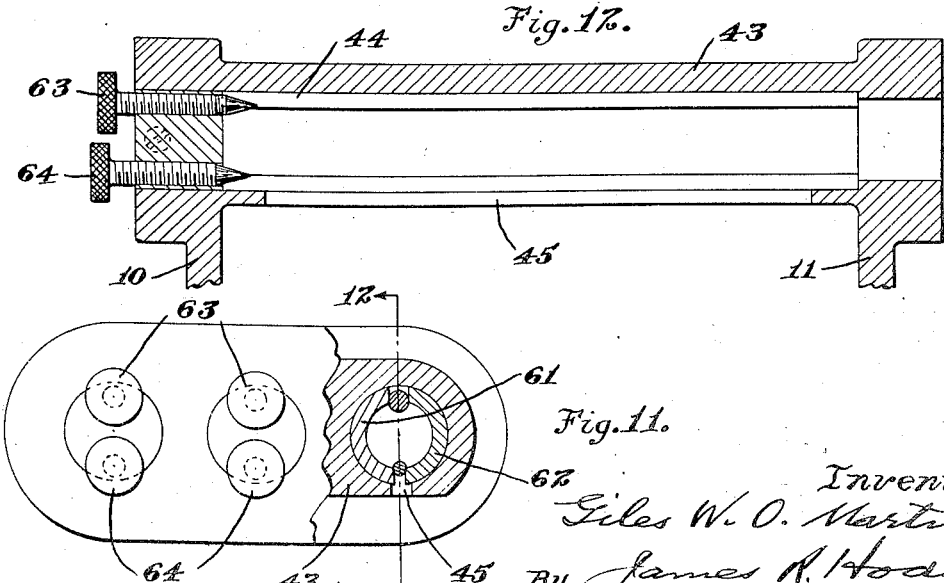

Patented Jan. 4, 1927.

1,613,521

UNITED STATES PATENT OFFICE.

GILES W. O. MARTIN, OF WEST MEDFORD, MASSACHUSETTS, ASSIGNOR TO AMERICAN SHOE MACHINERY COMPANY, OF EAST BOSTON, MASSACHUSETTS, A CORPORATION OF MASSACHUSETTS.

PRESSURE TEMPERING.

Application filed September 18, 1925. Serial No. 57,241.

My present invention relates to conditioning apparatus, and more particularly to a conditioning or tempering apparatus for leather or other fibrous material.

In certain manufacturing operations to be performed on leather or other fibrous material, and particularly certain operations to be performed on leather used in the manufacture of boots and shoes it is essential that the leather or other fibrous material be conditioned or tempered in order to properly and expeditiously carry out the operation thereon. Formerly this conditioning or tempering step or operation was performed by immersing the leather or other fibrous material in water or other liquid. The conditioning or tempering thus imparted to the leather or other fibrous material only affected a small portion of the material lying adjacent to the outer surface thereof and as a consequence this conditioning or tempering operation had to be repeated a number of times during the manufacture of the leather or other material into boots and shoes. Afterwards there was devised a machine for simultaneously flexing and subjecting the material to the action of a tempering solution. With certain types of shoes and with certain grades of leather or other fibrous material it was found that the machines of the prior art did not fully cover the conditions. For example, a certain type of shoe has incorporated therein a double thick sole made up of two or more layers of relatively heavy leather cemented together, and to subject such soles to the flexing action of the prior machines and to simultaneously impregnate the leather with a liquid resulted in the separation of the leather into its constituent layers.

In my present invention I have obviated the objections noted in prior machines and in prior processes and have devised a machine for conditioning or tempering leather or other fibrous material of any size, shape, or form, of any thickness, and whether or not such leather is formed of a single layer or of a plurality of layers of any thickness, cemented or otherwise secured together. In carrying out my present invention I provide an improved apparatus for feeding the leather or other fibrous material transversely of a movable stream of water or other liquid under pressure, whether such pressure be positive or negative; that is, whether there is pressure or vacuum, and by varying the degree of speed of the feeding of the leather or other fibrous material, or by varying the size of the orifice through which the water or other liquid flows, or by varying both these elements simultaneously, I am able to provide an apparatus which will thoroughly and economically condition or temper leather of any thickness or shape or built in any manner of two or more laminations, cemented or otherwise secured together.

The principal object of my invention, therefore, is an improved apparatus for conditioning or tempering leather or other fibrous material.

Another object of my invention is an improved conditioning or tempering machine for leather or other fibrous material utilizing a moving stream of water or other tempering liquid.

A further object of my invention is an improved apparatus for conditioning or tempering leather or other fibrous material provided with means for moving the leather or other material transversely of a movable column of water or other tempering liquid.

A still further object of my invention is an improved means for varying the speed of travel of the leather or other fibrous material or the area of the column of water or other tempering liquid or varying the pressure or vacuum of the moving column of water or other tempering liquid, or varying either or all of these various elements singly or in combination.

In the accompanying drawings illustrating the preferred embodiment of my invention, Fig. 1 is a plan view;

Fig. 3 is a sectional elevation on the line 3—3 of Fig. 1;

Fig. 4 is a sectional elevation on the line 4—4 of Fig. 2;

Fig. 5 is an elevation of the valve;

Fig. 6 is a development of the valve shown in Fig. 5;

Fig. 7 is a sectional elevation on the line 7—7 of Fig. 4;

Fig. 8 is a sectional elevation similar to the lower part of Fig. 3, but with a wire or perforated belt utilized in place of the leather belt there shown;

Fig. 9 is a front elevation of one of the nozzles employed;

Fig. 10 is a side elevation of Fig. 9, partly in section;

Fig. 11 is an end elevation, partly in section, of a valve chamber and showing the method of controlling the adjustable valves by means of a plurality of screws, and Fig. 12 is a sectional side elevation on the line 12—12 of Fig. 11.

Figure 1:
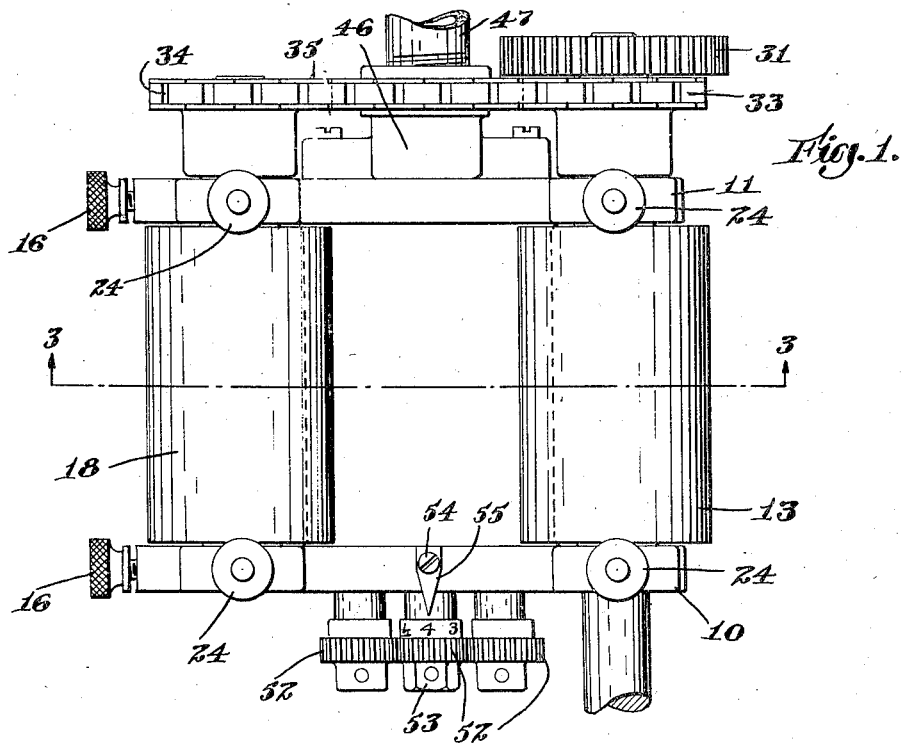

Referring to the drawings, 10 and 11 designate side frame members arranged parallel to, and spaced apart from, each other. Adjacent to the lower right hand portion of such members is rotatably mounted a shaft 12 and on such shaft between the side frame members 10 and 11 is secured a roller 13 of any suitable diameter and of a width approximately that distance between the side frame members 10 and 11. The shaft 12 extends laterally outward beyond the side frame member 10, for example, and may be provided with any suitable means for transmitting power thereto. This latter means may be an ordinary crank handle or a pulley over which a belt from a suitable source of power may run. As, however, the means for rotating the shaft 12 does not concern the present invention, it has not been illustrated and will not be further referred to. On the lower left hand portions of the side frame members 10 and 11 are formed slots 14, and in each of these slots is slidably mounted a bearing 15. Secured to the bearings 15 and threaded through the side frame members are adjusting screws 16 and by means of which the bearings 15 may be adjusted. The bearings 15 are in alignment with each other, and rotatably mounted in such bearings is a shaft 17. Secured to the shaft 17 between the side frame members 10 and 11 is a roller 18 equal in length and diameter to the length and diameter of the roll 13 above described as being on the shaft 12. Over the rolls 13 and 18 runs, ordinarily, an endless conveyor belt 19, preferably of leather, rubber, or other suitable and flexible fibrous material. In place of the flexible material above described, I may utilize an endless conveyor belt of flexible, but metallic material such as wire mesh 20 as shown in Fig. 8.

In each of the side frame members 10 and 11 above the shafts 12 and 17 respectively are formed guideways 21. In the guideways 21 are arranged slidable bearings 22. Secured to each of the bearings 22 and extending upwardly through a perforation in the top of the side frame members 10 and 11 are threaded studs 23. Screwing onto each of the studs 23 above the members 10 and 11 are thumb nuts 24 and by means of which the bearings 22 may be moved upward in the vertical slots 21. Between the under surface of the cross bar at the upper end of each of the slots 21 and the upper end of each of the bearings 22 and surrounding the threaded studs 23 is a coil spring 25 which tends to force the bearings 22 downwardly in the slots 21 and hold the under surface of each of the tumb nuts 24 in engagement with the top faces of the side frame members 10 and 11. The bearings 22 in the slots 21 adjacent to the right hand end of the side frame members 10 and 11 are in alignment with each other, and rotatably mounted in such bearings is a shaft 26, this shaft lying parallel to and above the shaft 12 above referred to. Secured to the shaft 26 between the side frame members 10 and 11 is a roller 27 of any suitable diameter, but preferably of a diameter substantially equal to the diameter of the roll 13 and of a length substantially that of a distance between the side frame members 10 and 11. The bearings 22 in the slots 21 adjacent to the left hand end of the side frame members 10 and 11 are in alignment with each other, and rotatably mounted in these bearings is a shaft 28, this shaft lying above and parallel to the shaft 17 above described. Secured to this shaft 28 between the side frame members 10 and 11 is a roll 29 substantially similar to the roll 27 secured to the shaft 26. By means of the thumb nuts 24 and threaded studs 23 the rolls 27 and 29 are spaced apart from the endless conveyor belt 19 a distance slightly less than the thickness of the material to be worked on.

Secured to the end of the shaft 12 adjacent to the side frame member 11 is a gear 30 which meshes with, and drives, a similar gear 31 secured to the end of the shaft 26. By having similar gears 30 and 31 on the shafts 12 and 26 respectively, equal angular rotation of the shafts 12 and 26 will take place at equal intervals of time. Secured to the shaft 26 between the gear 31 and the side frame member 11 is a sprocket 33 which is in alignment with a similar sprocket 34 secured on the end of the shaft 28. Over the sprockets 33 and 34 runs an endless sprocket chain 35 and the sprockets 33 and 34, being equal in diameter and pitch, the rolls 27 and 29 roll in the same direction and at the same angular speed per unit of time.

Formed on each of the side frame members 10 and 11 and extending laterally inward therefrom are lugs 36, each of which is perforated to allow free passage of vertically arranged studs 37. The upper ends of the studs 37 are secured to the under face of a frame 38 and in said frame 38 are secured a plurality of parallelly arranged shafts 42, these shafts lying parallel to each other and also parallel to the shafts 12, 17, 26, and 28 and below the upper reach of the endless conveyor belt 19 or 20. Screwed onto the studs 37 so as to engage with the lower face of the lugs 36 are nuts 39, and lying between the upper face of the lugs 36 and the under face of the frame 38 are coil springs 40. By means of the nuts 39 and springs 40 the frame 38 and parts carried thereby are yieldingly held in adjusted position. Rotatably mounted on the shafts 42 are rolls 41, these rolls being of such diameter as to allow the upper edge thereof to engage with the under side of the upper reach of the endless conveyor belts 37 and act as a rotatable table or support for the central portion of the upper reach, as may be clearly seen in Figs. 3 and 4.

The side frame members 10 and 11 are joined at their central portion by a member 43 which is drilled to form a plurality of parallelly arranged chambers 44, such members lying above the shafts 42, as clearly shown in Fig. 3. The member 43 on its under face is provided with a plurality of parallelly arranged narrow slots 45, these slots being equal in number to the number of parallelly arranged chambers 44, and each slot 45 provides means by which a chamber 44 may communicate with the outer air. The end portion 43 adjacent to the side frame member 11 is covered with a manifold 46 into which is screwed a pipe 47 leading from a source of fluid, preferably under pressure. In each of the parallelly arranged chambers 44 is rotatably mounted a hollow valve 48, each provided with a valve stem 49 that extends laterally outward beyond the side frame members 10. The inner end of each of the valve stems 49 is surrounded by a stuffing box arrangement 50. Referring to Figs. 5 and 6, and particularly to Fig. 6, it will be noted that each hollow valve is provided with a plurality of openings 51 arranged in groups, the first group, for example, containing two openings 51, the next group three openings 51, and so on so that the cross sectional area of each succeeding group is greater than the cross sectional area of the preceding group. It is obvious, therefore, that, by rotating the valve 48, the amount of fluid passing through the associated slot 45 may be increased or decreased at will. In order to rotate the valves 48 simultaneously I provide each valve stem 49 with a gear 52, these gears 52 on each stem 49 being equal in diameter and pitch and, although each valve stem 49, and therefore its associated valve 48, rotates simultaneously at the same speed, yet only two of the three valves shown will rotate in the same direction, the third rotating necessarily in the opposite direction. To provide for this I arrange the series of openings 51 on the centrally located valve 48 opposite to the series of openings 51 on the outer valves 48. The central gear 52 is provided with a non-cylindrical projection 53 and, by utilizing a proper tool, the valves may be readily rotated. Secured to the upper surface of the side frame member 10 by screw 54 is a pointer 55 which cooperates with indicating marks or characters on the hub of the central gear 52.

Figure 2:
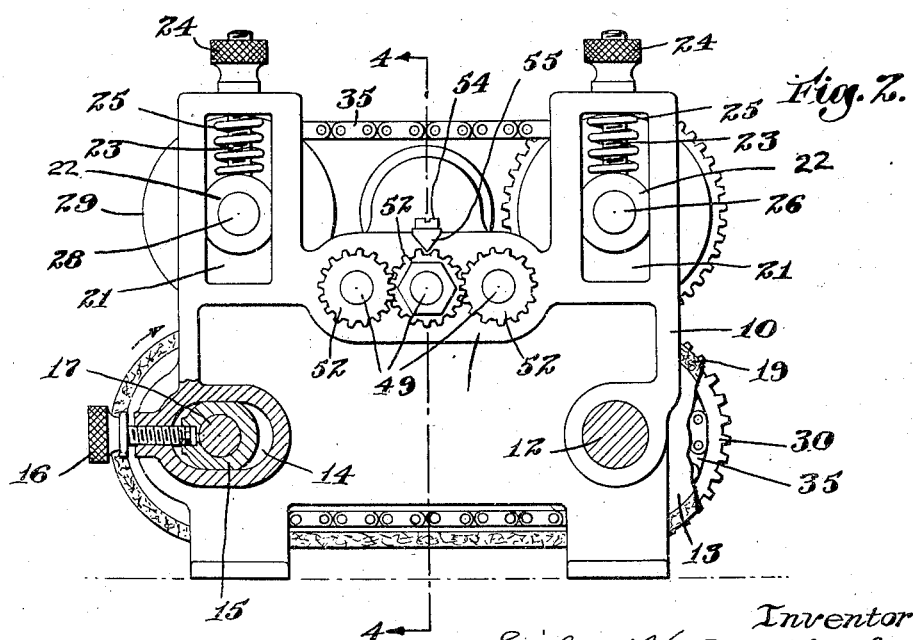
Fig. 2 is a side elevation.

Assume that it is desired to condition or temper a piece of fibrous material such as leather prior to its employment in the manufacturing operation, the tempering fluid under pressure is conducted through the pipe 47 from a source of supply through the manifold 46 and thence into the hollow valves 48. If the machine is a power driven one, power is turned into the shaft 12 which, by properly rotating, moves the endless conveyor belt 19 in the direction of the arrow shown, for example, in Figs. 2 and 3 and also rotates the rollers 27 and 28 in the direction of the arrows shown in such figures. The thumb screws 16 are utilized to move the bearings 15 to place the proper tension on the endless conveyor belt 19; the nuts 39 on the studs 37 are operated to adjust the tension with which the endless conveyor belt 19 bears on the plurality of parallelly arranged rolls 41; the thumb nuts 24 are operated to adjust the height of the rolls 27 and 29 relative to the upper reach of the endless conveyor belt 19. The centrally arranged valve stem 49 is rotated, allowing a flow of tempering fluid under pressure to pass from the source of supply through the valves 48, through the proper series of holes or passages 51, into and through the parallelly arranged slots 45. A piece of leather to be tempered is placed in the position shown in dotted lines in Fig. 3, and the roll 29 and endless conveyor 19 engaging therewith will feed the same through the machine in the direction of the arrow shown. As the piece of leather comes under the slots 45, the tempering fluid, passing through the slots 45 under pressure, will force its way through the leather, the amount of penetration depending on the speed of travel of the sheet of leather and the pressure of the tempering fluid. The amount of tempering fluid may be varied by proper manipulation of the valves 48.

While the machine may be constructed as above described, yet I may exchange the positions of the valves 48 and the rolls 41, placing such valves 48 in the position shown in Fig. 8 and may also utilize the construction of Fig. 8 to operate by forcing the tempering fluid into the leather by vacuum as distinguished from positive pressure. In this event it is preferable to enclose or submerge the apparatus in a tank containing a relatively large body of tempering fluid and, under these circumstances, pump the liquid through the leather being tempered and into the slots 45, through the valves 48, and thence out, under these circumstances the manifold 46 and pipe 47 acting as an outlet.

In order that I may adapt my apparatus for use either with a vacuum or a pressure system, I preferably employ the valve 60 which, by a proper system of piping, may connect the valves 48 to a positive force pump or to a vacuum pump.

In place of the valve 48 as shown, for example, in Figs. 5 and 6, I may employ a valve composed of two members 61 and 62, each slightly less than a half cylinder, these members 61 and 62 to be placed in the chambers 44. Screwed through the side frame member 10 in vertical alignment with each other are pointed thumb screws 63 and 64 respectively, the pointed ends of which pass into and between the members 61 and 62. By properly manipulating the thumb screws 63 and 64, the space between the lower edges of the members 61 and 62 may be increased or decreased at will, thus increasing or decreasing the available outlet for tempering fluid passing therethrough and through the slot 45.

While I have necessarily shown and described the preferred embodiment of my invention somewhat in detail, it is to be understood that I may vary the size, shape, and arrangement of parts within wide limits without departing from the spirit of the invention, and that the same can be utilized on box toes, counters, and other leather or fibrous articles with equal facility and advantageous results.

Having thus described my invention, what I claim as new is:

1. An improved tempering machine comprising a source of fluid supply, a plurality of parallelly arranged valves connected thereto and located at the exit end thereof, means for operating said valves simultaneously for varying the amount of fluid delivered therethrough, and means for feeding the material to be treated across the delivery end of said valves.

2. An improved tempering machine comprising a feed roller, an endless conveyor belt associated therewith, a fluid supply valve rotative adjacent said feed roll and above the endless conveyor and means associated with said valve for controlling the supply of fluid under pressure from a source of supply.

3. An improved tempering machine comprising an endless conveyor belt, a feed roll associated with the upper reach thereof, a plurality of parallelly arranged valves associated with the feed roll and the endless conveyor, means for operating said valves simultaneously to control the flow of fluid therethrough and a plurality of parallelly arranged, yieldingly held, rollers engaging the under surface of the endless conveyor for maintaining said endless conveyor in operative relation to the valves.

In testimony whereof, I have signed my name to this specification.

GILES W. O. MARTIN.